(12) United States Patent
Huo

(10) Patent No.: US 8,515,758 B2
(45) Date of Patent: Aug. 20, 2013

(54) SPEECH RECOGNITION INCLUDING REMOVAL OF IRRELEVANT INFORMATION

(75) Inventor: Qiang Huo, Beijing (CN)

(73) Assignee: Microsoft Corporation, Redmond, WA (US)

( * ) Notice: Subject to any disclaimer, the term of this patent is extended or adjusted under 35 U.S.C. 154(b) by 683 days.

(21) Appl. No.: 12/760,050

(22) Filed: Apr. 14, 2010

(65) Prior Publication Data

US 2011/0257976 A1 Oct. 20, 2011

(51) Int. Cl.
*G10L 15/14* (2006.01)
(52) U.S. Cl.
USPC ..................................... 704/256.2; 704/251
(58) Field of Classification Search
None
See application file for complete search history.

(56) References Cited

U.S. PATENT DOCUMENTS

| | | | |
|---|---|---|---|
| 5,289,562 A | 2/1994 | Mizuta et al. | |
| 5,825,978 A | 10/1998 | Digalakis et al. | |
| 5,903,865 A | 5/1999 | Ishimitsu et al. | |
| 7,254,538 B1 | 8/2007 | Hermansky et al. | |
| 7,672,847 B2 | 3/2010 | He et al. | |
| 2006/0229870 A1 | 10/2006 | Kobal | |
| 2007/0083373 A1 | 4/2007 | Liu et al. | |
| 2008/0059156 A1 | 3/2008 | Han et al. | |
| 2008/0172233 A1 | 7/2008 | Smaragdis et al. | |
| 2008/0243503 A1 | 10/2008 | Soong | |
| 2009/0112595 A1 | 4/2009 | Ljolje | |

OTHER PUBLICATIONS

D. Zhu and Q. Huo, "Irrelevant variability normalization based HMM training using MAP estimation of feature transforms for robust speech recognition", Proc. ICASSP-2008, pp. 4717-4720.
J. Wu, D. Zhu, and Q. Huo, "A study of minimum classification error training for segmental switching linear Gaussian hidden Markov models", Proc. ICSLP-2004, pp. 2813-2816.
Nishida, Kawahara, "Speaker Model Selection Based on the Bayesian Information Criterion Applied to Unsupervised Speaker Indexing", retrieved on Feb. 26, 2010 at <<http://ieeexplore.ieee.org/stamp/stamp.jsp?arnumber=01453601>>, IEEE Transactions on Speech and Audio Processing, vol. 13, No. 4, Jul. 2005, pp. 583-592.
Q. Huo and D. Zhu, "A maximum likelihood training approach to irrelevant variability compensation based on piecewise linear transformations", Proc. Interspeech-2006, pp. 1129-1132.
V. Digalakis, D. Rtischev, and L. G. Neumeyer, "Speaker adaptation using constrained estimation of Gaussian mixtures" IEEE Trans. on Speech and Audio Processing, vol. 3, No. 5, pp. 357-366, 1995.
ETSI standard document, "Speech processing, Transmission and Quality aspects (STQ); Distributed speech recognition; Advanced front-end feature extraction algorithm; Compression algorithms," ETSI ES 202 050 v1.1.1, Oct. 2002.
Gales, "Maximum Likelihood Linear Transformations for HMM-Based Speech Recognition," Jan. 1998, Computer Speech and Language, vol. 12, retrieved at <<http://citeseer.ist.psu.edu/viewdoc/download;jsessionid=74EA474EEA9B4538A4665246EB699B69?doi=10.1.1.21.444&rep=rep1&type=pdf>>, pp. 75-98.

(Continued)

*Primary Examiner* — Talivaldis Ivarssmits
(74) *Attorney, Agent, or Firm* — Lee & Hayes, PLLC

(57) ABSTRACT

Some implementations provide for speech recognition based on structured modeling, irrelevant variability normalization and unsupervised online adaptation of one or more speech recognition parameters. Some implementations may improve the ability of a runtime speech recognizer or decoder to adapt to new speakers and new environments.

17 Claims, 10 Drawing Sheets

(56) References Cited

OTHER PUBLICATIONS

Godfrey et al., "SWITCHBOARD: Telephone Speech Corpus for Research and Development,"; Acoustics, Speech, and Signal Processing, ICASSP-92., 1992 IEEE International Conference on Mar. 23-26, 1992 retrieved at <<http://ieeexplore.ieee.org/stamp/stamp.jsp?tp=&arnumber=225858>>, pp. 517-520.

Gunawardana, "Maximum Mutual Information Estimation of Acoustic HMM Emission Densities," Jun. 2001, CLSP Research Note, Note No. 40, CLSP, Johns Hopkins University, retrieved at <<http://www.clsp.jhu.edu/cgi-bin/zilla/servepaper.prl?resnote40&ps>>, 6 pages.

Huo et al., "Online Adaptive Learning of Continuous-Density Hidden Markov Models Based on Multiple-Stream Prior Evolution and Posterior Pooling," May 2001, IEEE Trans. on Speech and Audio Processing, vol. 9, No. 4, retrieved at <<http://ieeexplore.ieee.org/stamp/stamp.jsp?tp=&arnumber=917684>>, pp. 388-398.

Leggetter et al., "Maximum Likelihood Linear Regression for Speaker Adaptation of Continuous Density Hidden Markov Models," Apr. 1995, Computer Speech and Language, vol. 9, retrieved at <<http://citeseerx.ist.psu.edu/viewdoc/download?doi=10.1.1.89.2050&rep=rep1&type=pdf>>, pp. 171-185.

McDermott et al., "Discriminative Training for Large-Vocabulary Speech Recognition Using Minimum Classification Error," 2007, Proceedings: IEEE Transactions on Audio, Speech, and Language Processing, vol. 15, No. 1, retrieved at <<http://ieeexplore.ieee.org/stamp/stamp.jsp?arnumber=04032780>>, pp. 203-223.

Povey, "Discriminative Training for Large Vocabulary Speech Recognition," Jul. 2004, Ph.D. thesis, Cambridge University, retrieved at <<http://mir.cs.nthu.edu.tw/users/davidson833/relatedPapers/MPE/%5BPovey%202004%5DPhD_Thesis.pdf>>, 181 pages.

Povey et al., "FMPE: Discriminatively Trained Features for Speech Recognition," 2005, Proceedings: ICASSP, retrieved at <<http://ispl.korea.ac.kr/conference/icassp2005/pdfs/0100961.pdf>>, pp. 961-964.

Povey et al., "Improved Discriminative Training Techniques for Large Vocabulary Continuous Speech Recognition," May 7-11, 2001, Proceedings: Acoustics, Speech, and Signal Processing, (ICASSP '01), 2001 IEEE International Conference, retrieved at <<http://sites.google.com/site/dpovey/icassp01_mmi.pdf>>, pp. 45-48.

Q. Huo and D. Zhu, "Robust Speech Recognition Based on Structured Modeling, Irrelevant Variability Normalization and Unsupervised Online Adaptation", ICASSP, pp. 4637-4640, 2009 IEEE International Conference on Acoustics, Speech and Signal Processing, 2009.

Rabiner, "A Tutorial on Hidden Markov Models and Selected Applications in Speech Recognition," Feb. 1989, Proceedings: vol. 77, Issue 2, IEEE, retrieved at <<http://ieeexplore.ieee.org/stamp/stamp.jsp?tp=&arnumber=18626>>, pp. 257-286.

RT-02 Software, NIST Speech Group Website retrieved on Sep. 26, 2011 at <<http://itl.nist.gov/iad/mig/tests/rt/2002/software.htm>>, 3 pages.

Shi, et al., "A Study of Irrelevant Variability Normalization Based Training and Unsupervised Online Adaptation for LVCSR," 11th Annual Conference of the International Speech Communication Association, Interspeech 2010, Sep. 2010,, Makuhari, Chiba, Japan, pp. 1357-1360.

Vertanen, "An Overview of Discriminative Training for Speech Recognition," 2008, retrieved at <<http://citeseerx.ist.psu.edu/viewdoc/download?doi=10.1.1.71.8587&rep=rep1&type=pdf>>, 14 pages.

Young et al., "The HTK Book (for HTK version 3.4)," 2006, retrieved at <<http://home.agh.edu.pl/~gajecki/htkbook.pdf>>, 368 pages.

Zhang et al., "A Study of Irrelevant Variability Normalization Based Discriminative Training Approach for LVCSR," Mar. 2011, Proceedings: ICASSP, retrieved at <<http://ieeexplore.ieee.org/stamp/stamp.jsp?tp=&arnumber=5947556>>, pp. 5308-5311.

600

```
┌─────────────────────────────────────────┐
│ USE A SELECTED FEATURE TRANSFORM TYPE TO TRAIN A │
│ CORRESPONDING SINGLE SET OF GENERIC HMMs │
│                  602                     │
└─────────────────────────────────────────┘
                    ↓
┌─────────────────────────────────────────┐
│ USE THE SELECTED FEATURE TRANSFORM TO TRANSFORM │
│ FEATURE VECTORS AND CALCULATE THE CORRESPONDING │
│         OCCUPATION PROBABILITIES         │
│                  604                     │
└─────────────────────────────────────────┘
                    ↓
┌─────────────────────────────────────────┐
│    INITIALIZATION FOR OTHER FEATURE TRANSFORMS │
│                  606                     │
└─────────────────────────────────────────┘
                    ↓
┌─────────────────────────────────────────┐
│         UPDATE OTHER FEATURE TRANSFORMS  │
│                  608                     │
└─────────────────────────────────────────┘
                    ↓
┌─────────────────────────────────────────┐
│ REPEAT BLOCK 608 IF FURTHER UPDATING IS NECESSARY │
│                  610                     │
└─────────────────────────────────────────┘
```

Fig. 6

SPEECH RECOGNITION INCLUDING REMOVAL OF IRRELEVANT INFORMATION

BACKGROUND

Speech recognition has become ubiquitous in a huge array of diverse technologies, such as dictation software, computer operating systems, mobile and cellular devices, automotive navigation and entertainment systems, video gaming systems, telephony systems, and numerous other types of applications and devices. Typical speech recognition systems rely on one or more statistical models for recognizing an utterance or segment of speech to obtain a result, such as recognition of one or more words or word portions from the speech segment. Examples of statistical models commonly used in speech recognition include Hidden Markov Models, segment models, dynamic time warping, neural nets, or the like. Further, before a model can be used to recognize speech, the model is trained using training data. For example, a large number of acoustic signals can be generated by speakers, such as by reading from a known text, speaking specified sounds, or the like. This collection of acoustic speech signals can then be used to train the model to recognize speech sounds identified as being statistically similar to the training data.

Once the model has been trained, the model can be used by a speech recognition engine for recognizing a segment of speech. Typically, the incoming speech waveform is reduced to a sequence of feature vectors by applying a mathematical function to a short time segment of the speech. The sequence of feature vectors is then matched with the statistical model to recognize the incoming speech. Thus, the accuracy of a speech recognition engine is dependent on the models used for recognition and the training data used to train the models. Further, accuracy can also be affected when a speaker does not speak in a manner that closely matches the training data or is in an environment that does not match the environment in which the training data was recorded. This can cause irrelevant acoustic information to be included in the sequence of feature vectors, which can cause inaccuracy during the speech recognition.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein provide for speech recognition based on structured modeling, irrelevant variability normalization and unsupervised online adaptation of one or more speech recognition parameters.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

FIG. 6 illustrates a flow diagram of another example of a process for model training according to some implementations.

DETAILED DESCRIPTION

Robust Speech Recognition

The technologies described herein are generally directed towards training speech recognition components and using the trained components for speech recognition. For example, during a training stage, some implementations train one or more sets of acoustic models and one or more feature vector mapping transforms for use in recognizing basic units of speech relevant to phonetic classification. Additionally, during a recognition stage, some implementations use multiple recognition passes and apply an adaptation capability for improving recognition. For example, implementations herein can improve the ability of a runtime speech recognizer or decoder in a speech recognition engine to adapt to new speakers and new environments.

Some implementations herein provide approaches to robust automatic speech recognition that may include structured modeling, irrelevant variability normalization (IVN) and unsupervised real-time adaptation. In an example offline training stage, a set of generic Hidden Markov Models (HMMs) relevant to phonetic classification may be trained. Additionally, multiple sets of stochastic vector mapping linear transforms, each having a different degree of freedom, can also be trained using the training data. These vector mapping linear transforms (referred to herein as feature transforms) can be used to remove irrelevant features from the training data during training and also from speech segments during online speech recognition. In some implementations, the training may be carried out using a maximum likelihood (ML) IVN-based training strategy that includes training data from a diverse spectrum of sources and environments.

Further, in an example recognition stage, in response to receiving an unknown speech segment as an input, a first-pass recognition result can be obtained using the feature transforms and the pre-trained generic HMMs. Based on the first-pass recognition result, one or more appropriate feature transforms may be identified and adapted under a maximum likelihood criterion by using the unknown speech segment in the adaptation. The speech segment may then be recognized again using the adapted feature transform to generate a second-pass recognition result to achieve improved accuracy and performance. Additional adaptation and recognition passes may be performed subsequently until a predetermined criterion is met, such as a prescribed number of passes, a minimum confidence level in the result, or the like.

Figure 1:
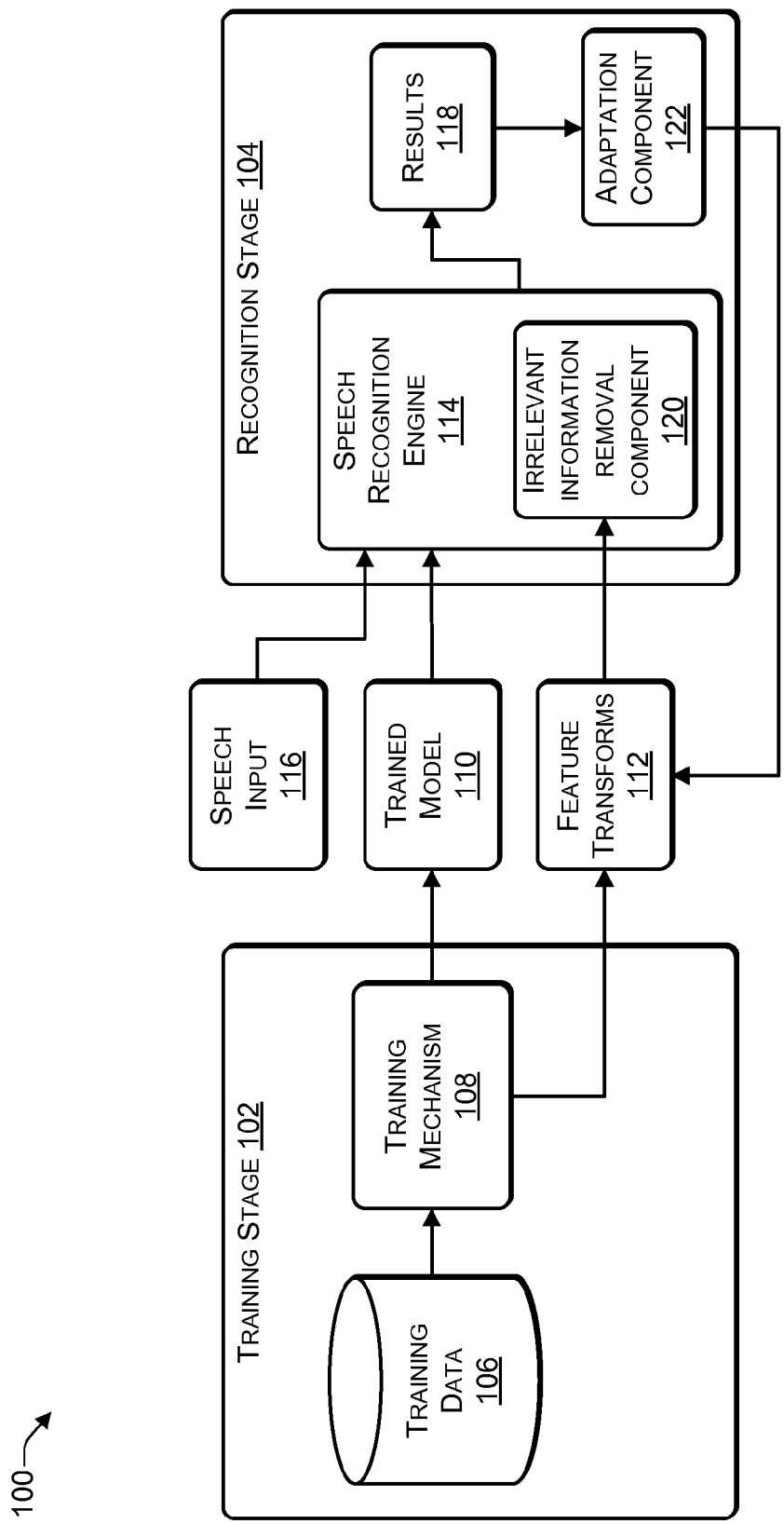
FIG. 1 illustrates an example of a block diagram of an architecture for speech recognition according to some implementations disclosed herein.

FIG. 1 illustrates a block diagram of an architecture 100 for explanation purposes for describing implementations herein. In the illustrated example, architecture 100 includes a training stage 102 and a recognition stage 104. For instance, the training stage 102 typically may be executed separately from the recognition stage 104. Thus, the training stage can be considered to be an "offline" process that is carried out in advance, such as when creating a speech recognition system, while the recognition stage 104 can be considered to be an "online" process for performing the actual speech recognition using the results achieved by the training stage 102.

In the training stage 102, training data 106 is applied to a training mechanism 108 for producing one or more trained models 110 and one or more transforms 112. For example, training data may include a large amount of acoustic data, such as captured speech, that corresponds to known word portions, words, phrases, sentences, or other units of speech. As is discussed additionally below, training mechanism 108 can apply the training data 106 to one or more statistical models for producing the trained models 110. Training mechanism 108 also can train feature transforms 112 that have trainable parameters. For example, as is discussed additionally below, multiple mathematically linear feature transforms having differing degrees of freedom and trainable parameters can be trained for removing irrelevancies from the trained model 110 and for providing transforms 112 that are used during the recognition stage 104. In some implementations, a single set of generic HMMs are trained as the trained model 110 from a plurality of feature transforms 112 having differing degrees of freedom.

Recognition stage 104 includes a speech recognition component or engine 114 that receives a segment of speech as a speech input 116 and applies the trained models 110 and transforms 112 for recognizing the speech input 116 to produce results 118. For example, the recognizing can include decoding the speech input to obtain a set of feature vectors that are matched against the models 110 as part of a speech recognition process for determining results 118. Further, according to some implementations, an irrelevant information removal component 120 can be provided with the speech recognition engine for absorbing certain irrelevant acoustic information. By removing irrelevant acoustic information from the sequence of feature vectors, the likelihood of the speech recognition engine producing an accurate result is improved. Additionally, in some implementations, multiple recognition passes can be performed to include adaptation of the parameters used to carry out the speech recognition for improving the results. For example, as is described additionally below, an adaptation component 122 may receive the results 118 and apply an adaptation process to one or more parameters used by the speech recognition engine for improving recognition accuracy and performance. In some implementations, multiple recognition and adaptation passes can be made before a final result is achieved. Consequently, implementations herein provide for robust speech recognition based on structured modeling with unsupervised online adaptation.

Figure 2:
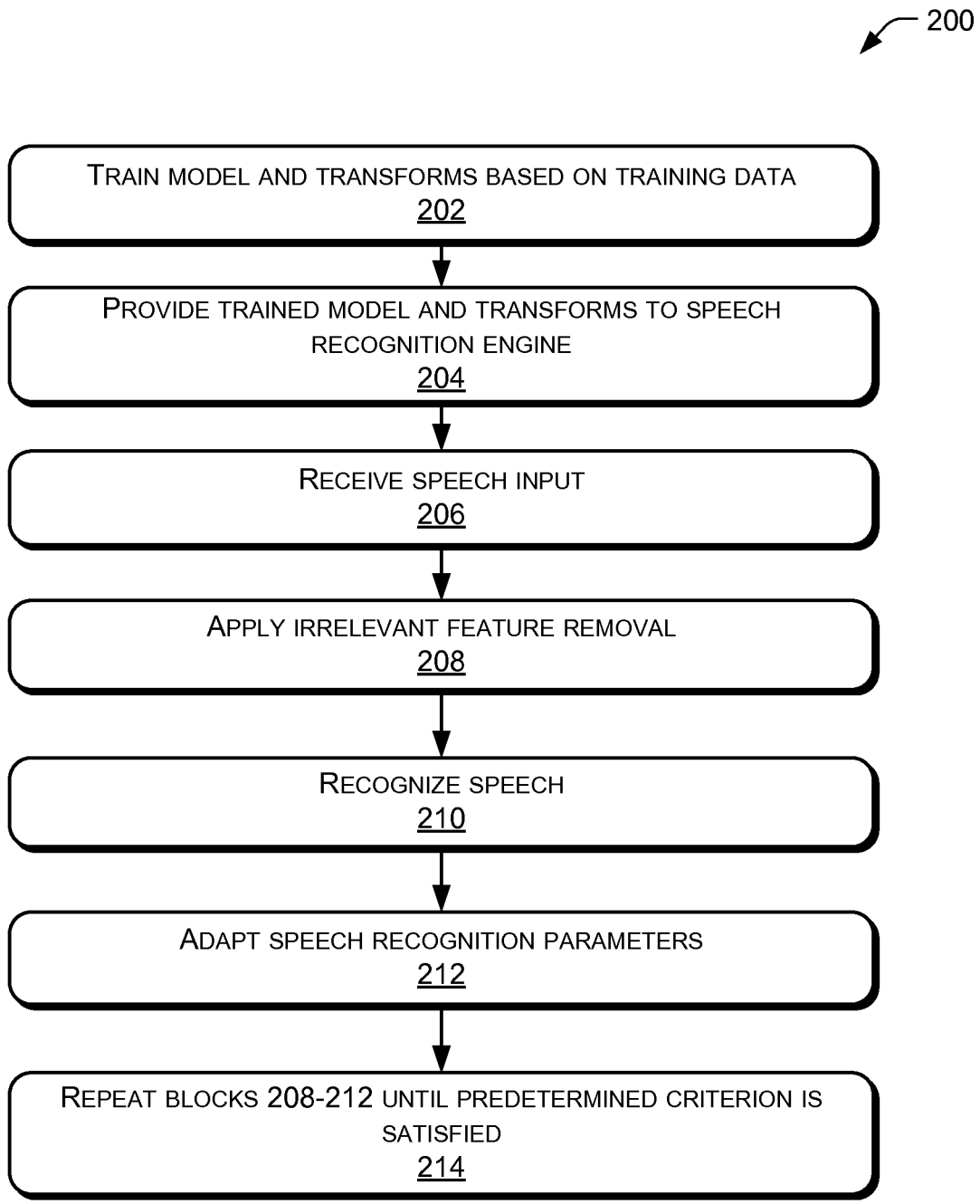
FIG. 2 illustrates a flow diagram of an example of a process for speech recognition according to some implementations.

FIG. 2 illustrates a flow diagram of an example of a process 200 for speech recognition according to some implementations herein. In the flow diagram, the operations are summarized in individual blocks. The operations may be performed in hardware, or as processor-executable instructions (software or firmware) that may be executed by one or more processors. Further, the process 200 may, but need not necessarily, be implemented using the architecture of FIG. 1.

Consequently, by way of explanation, and not limitation, the process 200 is described in the context of the architecture of FIG. 1.

At block 202, training data is used to train one or more models and one or more transforms to be used by a speech recognition engine. For example, as discussed above, a large amount of acoustic training data can be used for training a set of generic HMMs or other types of statistical models for use by the speech recognition engine. Furthermore, one or more transforms having trainable parameters can also be trained using the training data. In some implementations, multiple linear feature transforms are trained, with each feature transform having a different degree of freedom, so that plurality of transforms are provided with a range of degrees of freedom, as is described additionally below.

At block 204, the trained model and transforms are provided to the speech recognition engine for use by the speech recognition engine in recognizing speech. The speech recognition engines, modules and components described in implementations herein may be used in conjunction with a variety of different technologies. Consequently, implementations herein are not limited to any particular environment or application.

At block 206, speech input is received by the speech recognition engine. For example, speech recognition engine may receive an unknown utterance from an input device, such as a microphone or the like.

At block 208, the irrelevant features are removed from the unknown utterance. For example, a feature transform 112 is applied to the unknown utterance to attempt to absorb irrelevant acoustics that might cause inaccurate results in the speech recognition.

At block 210, the speech recognition engine attempts to recognize the speech input. For example, the speech recognition engine applies the trained model 110, along with other models and components, for recognizing the speech input and providing results, such as one or more recognized words or word portions.

At block 212, when the confidence level does not meet the threshold, one or more parameters can be selected or adapted to improve accuracy of the results. For example, as is described in greater detail below, one or more different transforms can be selected and used by the speech recognition engine during a second pass through the recognition engine. Further, the adaptation process can be repeated multiple times for executing multiple passes through the recognition engine.

At block 214, blocks 208-212 may be repeated until a pre-specified criterion is satisfied. For example, a fixed number of cycles (e.g., 3) may be specified, or the likelihood or confidence score may be compared with a minimum threshold, or the like. When the predetermined criterion is satisfied, a final result can be output by the speech recognition engine as one or more words or word portions. Consequently, implementations herein provide for training of acoustic models and feature transforms that can be used with unsupervised real-time adaptation of speech recognition parameters for improving result accuracy.

Speech Modeling

Figure 3:
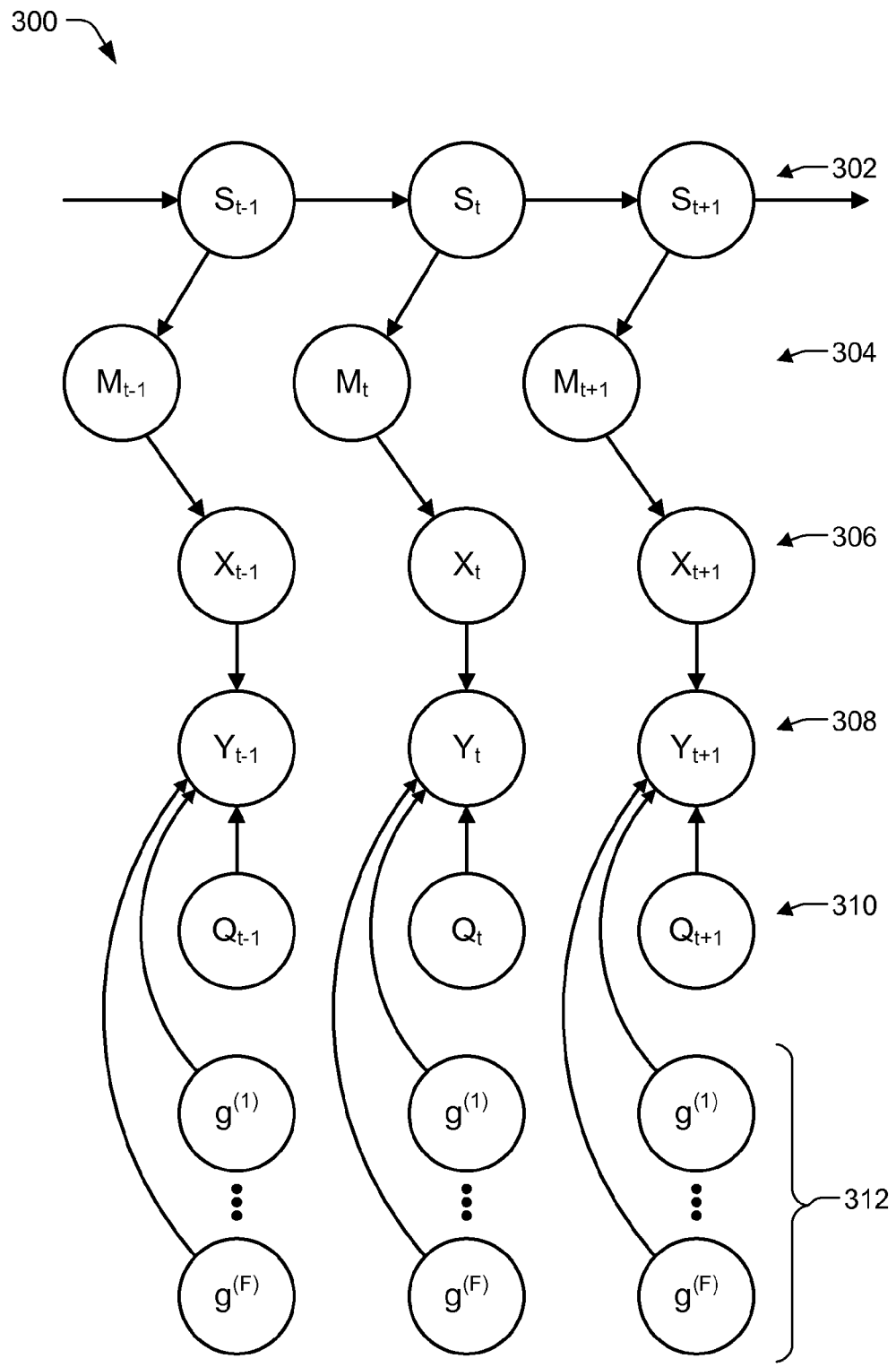
FIG. 3 illustrates an example of a model for speech recognition according to some implementations.

FIG. 3 illustrates a conceptual diagram of a model 300 for structured modeling of a basic speech unit according to some implementations herein. Model 300 includes states S 302 with a transition probability $\alpha_{ij}$ from state i to state j. Further, each state S 302 has M 304 Gaussian components with D-dimensional mean vectors $\mu_{sm}$ and D×D diagonal covariance matrices $\Sigma_{sm}$. In the illustrated example, "hidden" speech information (denoted as a feature vector sequence $X=\{x_t\}$ 306) relevant to phonetic classification may be modeled using a traditional Gaussian-mixture continuous density hidden Markov model (CDHMM) (referred to as a generic CDHMM hereinafter), while factors irrelevant to phonetic classification are taken care of by an auxiliary module. For example, given an utterance with observed feature vector sequence $Y=\{y_t\}$ 308, a specific label $q_t$ 310 can be identified for each D-dimensional feature vector $y_t$ by an appropriate labeling procedure. Furthermore, for a given $q_t$, a possible mapping function $g^{(q_t)}(\cdot)$, referred to herein as a feature transform (FT) 312, can be selected. The feature transform 312 is able to characterize the relationship between $x_t$ and $y_t$, and handle possible "distortions" caused by factors irrelevant to phonetic classification.

The set of feature transforms $\{g^{(f)}; f=1, \ldots, F\}$ 312, may be shared by all the basic speech units, which enables efficient and effective unsupervised online adaptation in the recognition stage. For example, let $\Lambda=\{\lambda\}$ denote the set of generic CDHMMs, as well as their model parameters, and $\Theta$ denote the set of parameters for F FTs. An IVN-based training procedure can then be designed to estimate $\Lambda$ and $\Theta$ from a large amount of diversified training data, $y=\{Y_i\}_{i=1}^I$ where $Y_i$ is a sequence of feature vectors of the ith training utterance. In the recognition stage, the parameters of the auxiliary module, $\Theta$, can be updated via unsupervised online adaptation by using the speech input itself, which is recognized again using a second recognition pass to achieve improved performance by using compensated models composed from the generic CDHMMs and an adapted auxiliary module.

Feature Transforms

Implementations herein may use several forms of feature transformations having different degrees of freedom or flexibility. The feature transforms herein utilize a maximum likelihood training approach based on the concept of stochastic vector mapping (SVM) to compensate for environmental variabilities in both training and recognition stages. In some implementations, the feature transforms are SVM functions that are piecewise linear transformations used in the training and/or recognition stages to compensate for possible "distortions" caused by factors irrelevant for phonetic classification. Thus, implementations of the feature transforms may be SVM functions that perform SVM-based compensation to compensate for "environmental" variabilities in both the training and recognition stages. For example, if a speech utterance corrupted by some "distortions" has been transformed into a sequence of feature vectors, then, given a set of training data $y=\{Y_i\}_{i=1}^I$, where $Y_i$ is a sequence of feature vectors of original speech, then the feature vectors can be partitioned into E "environment" acoustic classes or conditions, and the D-dimensional feature vector y under an environment class e follows the distribution of a Gaussian-mixture model (GMM):

$$p(y|e)=\sum_{k=1}^K p(k|e)p(y|k,e)=\sum_{k=1}^K p(k|e)N(y;\xi_k^{(e)}, R_k^{(e)})$$

where $p(k|e)$ is the probability for a particular stream k, y is the D-dimensional feature vector, e is the index of an acoustic condition class, $N(y;\xi_k^{(e)},R_k^{(e)})$ is a normal distribution with D-dimensional mean vector $\xi_k^{(e)}$ and diagonal covariance matrix $R_k^{(e)}$.

Automatic clustering of environment conditions from training data 37 can be carried out along with labeling of an utterance Y to a specific environment condition and the estimation of the above model parameters. Given the set of Gaussian mixture models (GMM) $\{p(y|e)\}$, the task of SVM-based compensation is to estimate the compensated feature vector from the original feature vector y by applying the environment-dependent transformation $F(y;\Theta^{(e)})$, where $\Theta^{(e)}$ represents the trainable parameters of the transformation and e denotes the corresponding environment class to which y belongs.

Implementations herein apply multiple types of feature transform stochastic vector mapping functions (referred to hereafter as "FT functions") having differing degrees of freedom. Examples of FT functions having differing degrees of freedom are provided by the following three types of FT functions. An example of a first suitable FT function type (referred to as FT3) may be defined as follows:

$$\hat{x} \triangleq F_3(y;\Theta^{(e)})=A^{(e)}y+b^{(e)}, \quad (1)$$

where $A^{(e)}$ is a nonsingular D×D matrix, $b^{(e)}$ is a D-dimensional vector, $\Theta^{(e)}=\{A^{(e)},b^{(e)}\}$ represents the trainable parameters of the transformation, and e denotes the corresponding acoustic condition to which y belongs. In this case, $q_t=e$, F=E, and $x_t=g^{(q_t)}(y_t)=A^{(e)}y_t+b^{(e)}$. This FT function was introduced in Huo et al., "A Maximum Likelihood Training Approach to Irrelevant Variability Compensation Based on Piecewise Linear Transformations," *Proc. Interspeech*-2006, pp. 1129-1132, 2006.

A second suitable FT function type (referred to as FT5) may be defined as $$\hat{x} \triangleq F_5(y;\Theta^{(e)})=A^{(e)}y+b_k^{(e)}, \quad (2)$$

where, for the acoustic condition e to which y belongs, $$k = \arg\max p(l|y,e) \quad (3)$$

$$l = 1, \ldots, K$$

with $$p(l|y,e) = \frac{p(l|e)p(y|l,e)}{\sum_{j=1}^K p(j|e)p(y|j,e)}$$

and $\Theta^{(e)}=\{A^{(e)},b_l^{(e)}, l=1, \ldots, K\}$. In this case, $q_t=(e,k)$, F=E×K, and $x_t=g^{(q_t)}(y_t)=A^{(e)}y_t+b_k^{(e)}$. This FT function was also introduced in Huo et al., "A Maximum Likelihood Training Approach to Irrelevant Variability Compensation Based on Piecewise Linear Transformations," *Proc. Interspeech*-2006, pp. 1129-1132, 2006.

A third suitable FT function type (referred to as FT6) may be defined as:

$$\hat{x} \triangleq F_3(y;\Theta^{(e)})=A^{(e)}y+b^{(e)}, \quad (4)$$

where $\Theta^{(e)}=\{A_l^{(e)}, b_l^{(e)}; l=1, \ldots, K\}$, and k is calculated by using Eq. (3). In this case, $q_t=(e,k)$, F=E×K, and $x_t=g^{(g_t)}(y_t)=A_k^{(e)}y_t+b_k^{(e)}$. This FT mapping function was introduced in Zhu et al., "Irrelevant Variability Normalization Based HMM Training Using MAP Estimation of Feature Transforms for Robust Speech Recognition," *Proc. ICASSP*-2008, pp. 4717-4720, 2008.

As mentioned previously, in the above equations (1), (2) and (4), $A^{(e)}$ or $A_k^{(e)}$ is a nonsingular D×D matrix (referred to hereafter as "A matrix"), and $b^{(e)}$ or $b_k^{(e)}$ is a D-dimensional vector (referred to hereafter as "bias vector"). Thus, it may be seen from these equations that FT5, incorporating $b_k^{(e)}$ instead of $b^{(e)}$, has a greater degree of freedom than FT3. Additionally, FT6, incorporating $b_k^{(e)}$ instead of $b^{(e)}$, and $A_k^{(e)}$ instead of $A^{(e)}$, has a greater degree of freedom than both FT3 and FT5.

Joint ML Training of the Parameters of FT Functions and CDHMMs

As mentioned above, both the feature transform stochastic vector mapping functions and the generic HMMs can be trained using the training data. For example, when FT function $F_3(y;\Theta^{(e)})=A^{(e)}y+b^{(e)}$ or FT function $F_6(y;\Theta^{(e)})=A_k^{(e)}y+b_k^{(e)}$ is used, a joint ML training procedure is as follows:

First, a set of CDHMMs, $\Lambda$, are trained from multi-condition training data y and used as the initial values of HMM parameters. The initial values of transformation matrices $A^{(e)}$ (or $A_k^{(e)}$ in the case of $F_6$) are set to be identity matrices and the initial values of bias vectors $b^{(e)}$ (or $b_k^{(e)}$) are set to be zero vectors. Second, given the HMM parameters $\Lambda$, for each environment class e, the environment-dependent mapping function parameters $\overline{\Theta}^{(e)}$ can be estimated by using a constrained maximum likelihood linear regression approach to increase the likelihood function $L(\Theta, \Lambda)$. Third, each training utterance is transformed using the FT3 (or FT6) mapping function with parameters $\overline{\Theta}$. Using the environment compensated utterances, several EM iterations with the EM (expectation-maximization) algorithm are performed to re-estimate CDHMM parameters $\overline{\Lambda}$, with an increase of the likelihood function $L(\overline{\Theta}, \Lambda)$. Finally, the second and third operations can be repeated several times, such as where the number of cycles is determined by the cross-validation recognition result on an independent development data set or is determined simply by experience. After the above operations are completed, $\overline{\Theta}$ and $\overline{\Lambda}$ are obtained as an ML estimation of the feature transform mapping function parameters and the CDHMM parameters, which can then be used in the recognition stage for feature compensation.

Furthermore, for example, when FT function $F_5(y;\Theta^{(e)})=A^{(e)}y+b_k^{(e)}$ is used, a joint ML training procedure is as follows:

First, a set of CDHMMs, $\Lambda$, are trained from multi-condition training data y and used as the initial values of HMM parameters. The initial values of transformation matrices $A^{(e)}$ are set to be identity matrices and the initial values of bias vectors $b_k^{(e)}$ are set to be zero vectors. Second, given the HMM parameters $\Lambda$, for each environment class e, the environment-dependent mapping function parameters $\overline{\Theta}^{(e)}$ can be estimated by using the method of alternating variables to increase the likelihood function $L(\Theta, \Lambda)$ as follows: estimating $A^{(e)}$ by fixing $b_k^{(e)}$ followed by estimating $b_k^{(e)}$ by fixing $A^{(e)}$. Third, each training utterance is transformed using the FT5 mapping function with parameters $\overline{\Theta}$. Using the environment compensated utterances, several EM iterations with the EM algorithm are performed to re-estimate CDHMM parameters $\overline{\Lambda}$, with an increase of the likelihood function $L(\Theta, \Lambda)$. Finally, the second and third operations can be repeated several times, such as where the number of cycles is determined by the cross-validation recognition result on an independent development data set or is determined simply by experience. After the above operations are completed, $\overline{\Theta}$ and $\overline{\Lambda}$ are obtained as an ML estimation of the feature transform mapping function parameters and the CDHMM parameters, which can then be used in the recognition stage for feature compensation.

Figure 4:
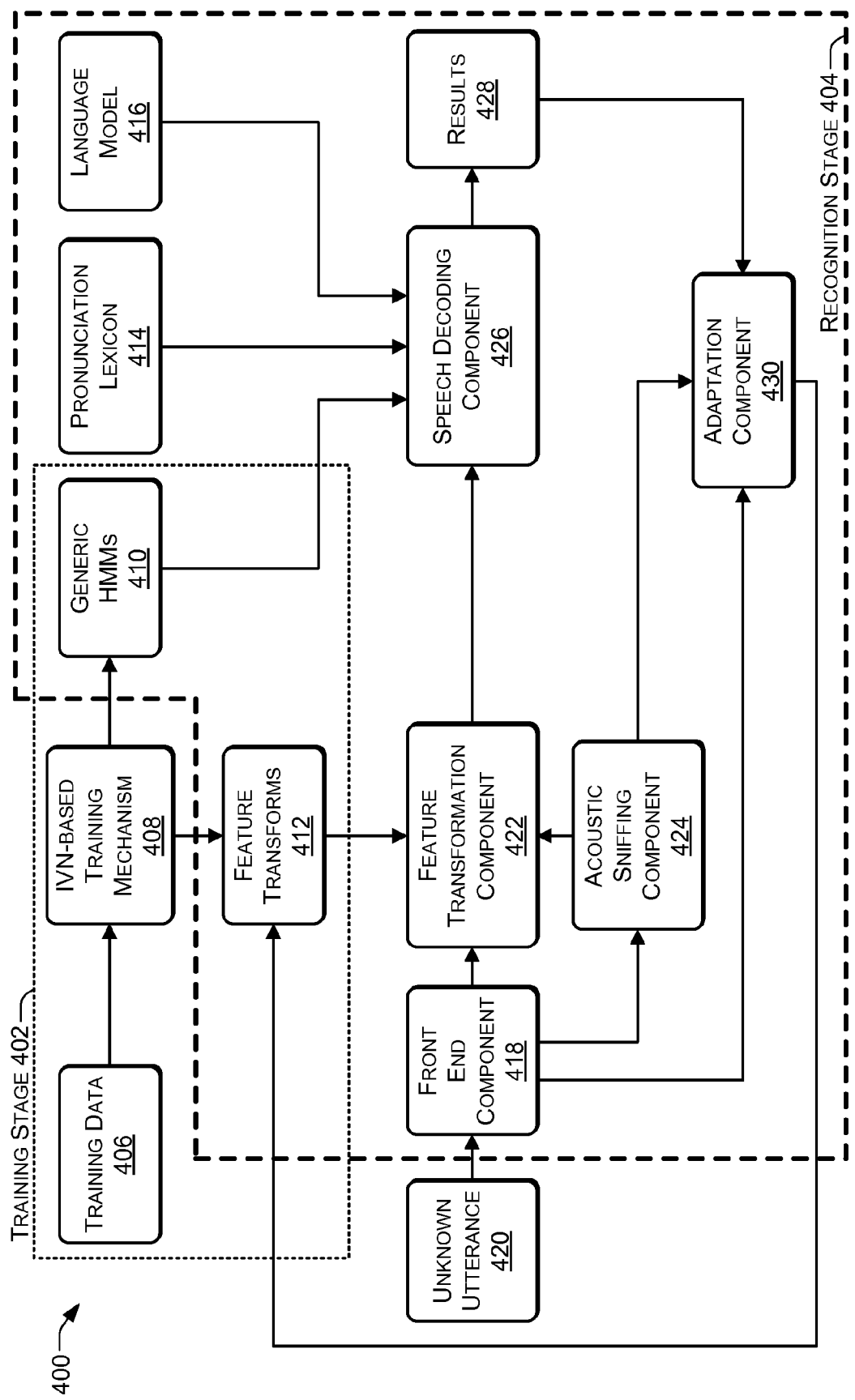
FIG. 4 illustrates an example of a block diagram of an architecture for speech recognition according to some implementations.

During the recognition stage, for instance, given an unknown utterance Y, the most similar training environment class e is identified. Then, the corresponding GMM and the mapping function are used to derive a compensated version of $\hat{X}$ from Y. For the convenience of notation, $F(Y;\Theta^{(e)})$ is used to denote the compensated version of the utterance Y by transforming individual feature vector $y_t$ using the trained feature transforms. After feature compensation, the compensated feature vectors X are delivered to a speech decoding portion of a speech recognition engine for recognition using the IVN-trained HMMs Example Architecture FIG. 4 illustrates a block diagram of an architecture 400 for explanation purposes for describing implementations herein. In the illustrated example, architecture 400 includes an offline training stage 402 and an online recognition stage 404. In the offline training stage 402, training data 406 (i.e., acoustic training data) is provided to an irrelevant variability normalization (IVN)-based training mechanism 408. For example, in a traditional HMM compensation approach to speech recognition, the set of generic HMMs are typically trained from "clean" speech, i.e., training data obtained in low noise environments. However, implementations herein apply a maximum likelihood approach to training generic HMMs from both "clean" and "corrupted" or "noisy" speech based on the concept of irrelevant variability normalization. This training approach can achieve significant improvements in recognition accuracy compared to traditional training approaches. However, because a diversified training data set and/or possible acoustic mismatches between training and testing conditions can affect maximum likelihood modeling, the structure learned from the training data by using a maximum likelihood training method will not necessarily generalize well on mismatched tasks. Consequently, the goal behind IVN training is to be aware of both data that comprises phonemes or speech segments and other acoustic data that is irrelevant to the speech phonemes, such as speaker condition, background noise, distortion, or the like. As discussed above, during IVN training, feature transforms 412 may be applied during training to attempt to absorb irrelevant acoustic information from the training data during creation of the generic HMMs 410. The IVN-based training mechanism 408 produces a set of generic HMMs 410 that model acoustic data relevant for phonetic classification, and also produces a set of feature transforms 412 that have been trained using the IVN-based training Examples for carrying out IVN training incorporating the feature transforms herein have been described above with respect to the FT3 function, and are described additionally below.

Further, a pronunciation lexicon 414 and a language model 416 are additional components that may be produced using offline training. For example, language model 416 is typically trained using a large amount of textual data, and may be used to correlate phonemes or acoustic signals to a particular language and words of the language. Further, pronunciation lexicon 414 can include how each word is supposed to be pronounced for correlating words with the phonemes or acoustic signals identified using the generic HMMs 410.

The recognition stage 404 includes components for carrying out online speech recognition. Generic HMMs 410, transforms 412, pronunciation lexicon 414 and language model 416 are components created offline and provided to the online voice recognition stage 404. The recognition stage 404 further includes a front end component 418 that receives an unknown utterance or speech segment 420 for speech recognition. The front end component 418 receives the unknown utterance or speech segment 420 as a waveform and outputs a first sequence of feature vectors to a feature transformation component 422. An acoustic sniffing component 424 also receives at least some of the first sequence of feature vectors from the front end component 418, and detects the acoustic characteristics of the unknown utterance. Based on the detected acoustic characteristics, the acoustic sniffing component is able to determine a likely candidate type of feature transform 412 to be used by the feature transform component 422.

The feature transform component 422 applies the selected feature transform 412 to attempt to absorb irrelevant factors of the first sequence of feature vectors. For example, the unknown utterance may contain acoustic signals that produce feature vectors that are not relevant to the phonemes that are to be eventually recognized. Factors such as background noise, an accent of a speaker, distortion, and other features in the acoustic signal can produce irrelevant information that could lead to inaccurate speech recognition. Thus, a suitable feature transform 412 is used to attempt to absorb the irrelevant acoustic information from the first sequence of feature vectors received from the front end component 418. In some implementations, the feature transform component and the acoustic sniffing component correspond to the irrelevant information removal component 120 described with respect to FIG. 1.

Following the transformation operation using the feature vector, the feature transform component 422 then provides a second or "cleaned" sequence of feature vectors to a speech decoding component 426. The speech decoding component 426 applies the generic HMMs 410, the pronunciation lexicon 414 and the language model 416 to the input received from the feature transform component 422 to decode the second sequence of feature vectors into recognizable parts of speech for producing results 428.

In some implementations, a predetermined number of passes through the speech recognition stage are performed, with adaptation being carried out prior to each subsequent pass. In other implementations, no predetermined number of passes is specified. Thus, if the unknown utterance is similar to the training data, there may be a high confidence that the results 428 are accurate (i.e., a high likelihood of a correct match). In this situation, the results 428 can be output without further processing. However, if the unknown utterance is very different from the training data, then the confidence in the initial results 428 may not be high. For example, the confidence might not equal a predetermined minimum confidence threshold. In this case, another pass through the recognition components can be executed. Prior to conducting the next pass, the results 428 are provided to an adaptation component 430. The adaptation component 430, adapts and updates the feature transform 412 used by the feature transformation component 422 based on the results 428 and the initial unknown utterance received from the front end. The adaptation component also may receive input from the acoustic sniffing component 424 regarding the feature transform 412 used in the first pass.

The adaptation component 430 processes these inputs and determines a feature transform to update, such as by modifying the feature transform 412. Examples of the updating are described additionally below. The unknown utterance is then passed through the feature transform component 422 another time using the adapted feature transform 412. The cleaned sequence of feature vectors is again delivered to the speech decoding component 426 for producing a second set of results 428. In some implementations, the confidence level in the results may be examined, and another adaptation operation and pass through the recognition stage may be performed if the confidence level is below a threshold. In some implementations, the adaptation component 430 corresponds to the adaptation component 122 described with respect to FIG. 1. Further, in some implementations, the front end component 418, the feature transform component 422, the acoustic sniffing component 424, the speech decoding component 426, the generic HMMs 410, the pronunciation lexicon 414, the language model 416, and the feature transforms 412 correspond to the speech recognition engine 114 described with respect to FIG. 1.

Speech Decoding Component Modification

According to implementations herein, some feature transform stochastic vector mapping functions can be implemented in a pure feature-compensation mode during the recognition stage without requiring a change to a speech decoding component of the speech recognition engine, and are therefore quite efficient, even for large vocabulary continuous speech recognition (LVCSR) tasks. On the other hand, some other approaches to feature transformation mapping functions working in a pure model-compensation mode during the recognition stage are computationally more expensive for LVCSR tasks because use of these feature transforms requires modification to the speech decoding component. For example feature transforms FT3 and FT5 discussed above do not require modification to the speech decoding component. Further, according to implementations herein, feature transform FT6 can be implemented in a hybrid mode, in which each frame of the feature vector is still subject to a linear transformation, the decoding component may be changed just slightly by including an appropriate "Jacobian" term when evaluating the probability density function (PDF) value for each Gaussian component in the generic CDHMMs as follows:

$$p(y|\Lambda,\Theta)=N(F_6(y;\Theta^{(e)});\mu_{sm},\Sigma_{sm})|\det(A_k^{(e)})|,$$

where $\det(A_k^{(e)})$ is the determinant of matrix $A_k^{(e)}$, and $|\det(A_k^{(e)})|$ is the "Jacobin" term. If $A_k^{(e)}$ will not be adapted, the above Jacobian terms can be precomputed and cached, and can then be used by the speech decoding component 426 as called on. Accordingly, the computational complexity of using the FT6 feature transform lies between the two above-mentioned sets of approaches.

Parallel Decoding with Multiple Systems

Figure 5:
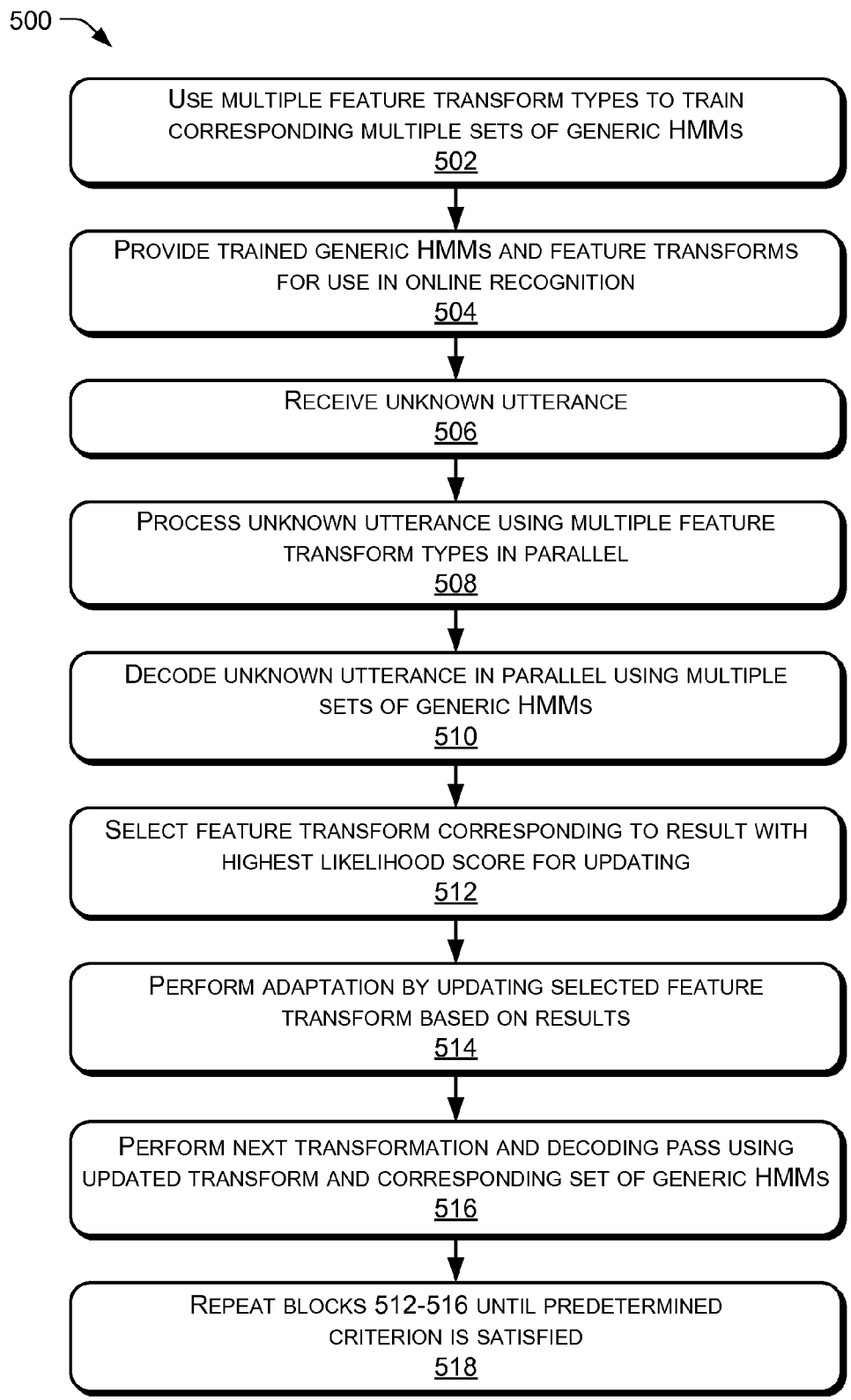
FIG. 5 illustrates a flow diagram of an example of a process for model training and speech recognition according to some implementations.

FIG. 5 illustrates a flow diagram of an example of a process 500 for speech recognition with parallel decoding according to some implementations herein. In the flow diagram, the operations are summarized in individual blocks. The operations may be performed in hardware, or as processor-executable instructions (software or firmware) that may be executed by one or more processors. Further, the process 500 may, but need not necessarily, be implemented using the architecture of FIG. 4. Consequently, by way of explanation, and not limitation, the process 500 is described in the context of the architecture of FIG. 4.

At block 502, during the training stage, maximum likelihood-IVN training is executed using a plurality of feature transform types, with each feature transform type having a different degree of freedom from the other feature transform types. For example, using the feature transforms discussed above, FT3, FT5, and FT6, a set of generic HMMs may be obtained for each feature transform. Thus, the training data can be used to create a set of FT3 transforms and a corresponding set of FT3-based generic HMMs, such as a trained set of Gaussian-mixture continuous density HMMs (CDHMMs). Furthermore, the training data can also be used to generate a set of FT5 transforms and a corresponding set of FT5-based generic CDHMMs, and a set of FT6 transforms and a corresponding set of FT6-based generic CDHMMs.

At block 504, the generated sets of FT3, FT5 and FT6 transforms and FT3-based generic CDHMMs, FT5-based generic CDHMMs and FT6-based generic CDHMMs are provided for use during online recognition.

At block 506, an unknown utterance Y is received for speech recognition.

At block 508, given the unknown utterance Y, parallel processing is executed by using feature transforms FT3, FT5, and FT6 (as trained above). For example, processing of feature vectors of the unknown utterance is carried out using the feature transforms to absorb irrelevant factors.

At block 510, the corresponding sets of generic CDHMMs are applied in parallel to the feature vectors of the unknown utterance to obtain the "first-pass" recognition results, R1(FT3), R1(FT5), R1(FT6), respectively. For example, the parallel decoding can be based on the provision that $\mu_{sm}=[\mu_{sm1}, \ldots, \mu_{smD}]^T$ denotes the D-dimensional mean vector, and $\Sigma_{sm}=\text{diag}\{\sigma_{sm1}^2, \ldots, \sigma_{smD}^2\}$ denotes the diagonal covariance matrix for Gaussian component m in state s of generic CDHMMs. As a by-product of the parallel processing, the corresponding likelihood scores are also produced for each result, L1(FT3), L1(FT5), L1(FT6), respectively, which can be used to determine a confidence level for the results.

At block 512, if a next pass is to be carried out, then prior to performing the next pass, the results and transform corresponding to the highest likelihood is determined, for selecting which type of feature transform and which set of generic CDHMMs are used in online adaptation and updating.

At block 514, given the recognition result, the selected form of transforms, and the corresponding set of generic CDHMMs for the selected transform, online adaptation and updating is carried out to update $b^{(e)}$ or $b_k^{(e)}$ using the corresponding IVN-trained transform as the initial value. For example, The updating formula of $b^{(e)}$ for FT3 is as follows:

$$b_d^{(e)} = \frac{\sum_{t,s,m} \delta[e, q_t] \zeta_t(s, m)(\mu_{smd} - A_d^{(e)} \cdot y_t)/\sigma_{smd}^2}{\sum_{t,s,m} \delta[e, q_t] \zeta_t(s, m)/\sigma_{smd}^2}, \quad (5)$$

where $\delta[\cdot,\cdot]$ is a Kronecker delta function, $A_d^{(e)}$ is the dth row of $A^{(e)}$, and $\zeta_t(s,m)$ is the occupation probability of Gaussian component m in state s of CDHMMs, at time t of the current compensated observation $\hat{x}_t = F_3(y_t; \Theta^{(e)})$.

The updating formula of $b_k^{(e)}$ for FT5 is as follows:

$$b_{kd}^{(e)} = \frac{\sum_{t,s,m} \delta[(e, k), q_t] \zeta_t(s, m)(\mu_{smd} - A_d^{(e)} \cdot y_t)/\sigma_{smd}^2}{\sum_{t,s,m} \delta[(e, k), q_t] \zeta_t(s, m)/\sigma_{smd}^2}, \quad (6)$$

where $A_d^{(e)}$ is the dth row of $A^{(e)}$, and $\zeta_t(s,m)$ is the occupation probability of Gaussian component m in state s of CDHMMs, at time t of the current compensated observation $\hat{x}_t = F_5(y_t; \Theta^{(e)})$.

The updating formula of $b_k^{(e)}$ for FT6 is as follows:

$$b_{kd}^{(e)} = \frac{\sum_{t,s,m} \delta[(e, k), q_t] \zeta_t(s, m)(\mu_{smd} - A_{kd}^{(e)} \cdot y_t)/\sigma_{smd}^2}{\sum_{t,s,m} \delta[(e, k), q_t] \zeta_t(s, m)/\sigma_{smd}^2}, \quad (7)$$

where $A_{kd}^{(e)}$ is the dth row of $A_k^{(e)}$. Note that $\xi_t(s,m)$ is calculated by a forward-backward procedure with the probability density function (PDF) value for each frame of observation evaluated as follows:

$$p(y_t|\Lambda,\Theta) = N(F_6(y_t;\Theta^{(e)}); \mu_{sm}, \Sigma_{sm})|\det(A_k^{(e)})|, \quad (8)$$

where $\det(A_k^{(e)})$ is the determinant of matrix $A_k^{(e)}$.

At block 516, a next transformation and decoding pass is performed on the unknown utterance using the updated set of transforms and the corresponding set of generic CDHMMs to obtain new recognition result.

At block 518, blocks 512-516 may be repeated until a pre-specified criterion is satisfied. For example, a fixed number of cycles (e.g., 3) may be specified, or the likelihood score may be compared with a minimum threshold likelihood, or the like.

Using Multiple Feature Transforms with a Single Set of Generic CDHMMs

In the implementations of FIG. 5, a set of generic CDHMMs is generated for each of the multiple feature transform types used. For example, if FT3, FT5 and FT6 are used, then three sets of generic CDHMMs are generated, i.e., one set of generic CDHMMs corresponding to each type of feature transform. However, three sets of generic CDHMMs can occupy substantial memory space during the online stage. Consequently, some implementations herein provide for a single set of generic CDHMMs able to be used with multiple feature transform function types.

FIG. 6 illustrates a flow diagram of an example of a process 600 for offline training to generate a single set of generic CDHMMs according to some implementations herein. In the flow diagram, the operations are summarized in individual blocks. The operations may be performed in hardware, or as processor-executable instructions (software or firmware) that may be executed by one or more processors. Further, the process 600 may, but need not necessarily, be implemented using the architecture of FIG. 4. Consequently, by way of explanation, and not limitation, the process 600 is described in the context of the architecture of FIG. 4.

At block 602, maximum likelihood IVN-based training is carried out using a selected one of the feature transform function types. For example, feature transform FT6 can be used by the IVN training mechanism to obtain a set of FT6 feature transforms, and a set of FT6-based generic CDHMMs.

At block 604, the selected feature transform type is used to calculate the "occupation probabilities". For example, the FT6 feature transform may be used to transform feature vectors and calculate the corresponding occupation probabilities conditioned on the trained FT6-based generic CDHMMs.

At block 606, initialization is performed for the other feature vector transform types. For example, $A^{(e)}$ may be initialized as an identity matrix and $b^{(e)}$ (for FT3) or $b_k^{(e)}$ (for FT5) is initialized as a zero bias vector, which can then be used to re-estimate $A^{(e)}$ and $b^{(e)}$ (for FT3) or $b_k^{(e)}$ (for FT5).

At block 608, the other feature transform types are trained. For example, given the current estimate of $A^{(e)}$ and $b^{(e)}$ (for FT3) or $b_k^{(e)}$ (for FT5), and the FT6-based generic CDHMMs, updating is carried out as described above in the section on Joint ML Training of the Parameters of FT Functions and CDHMMs.

At block 610, block 608 can be repeated to further update the other feature transforms. For example, additional updating of FT3 and FT5 can be carried out. When updating is completed, the set of FT3 feature transforms, FT5 feature transforms, FT6 feature transforms and FT6-based generic CDHMMs are provided to the recognition stage.

Figure 7:
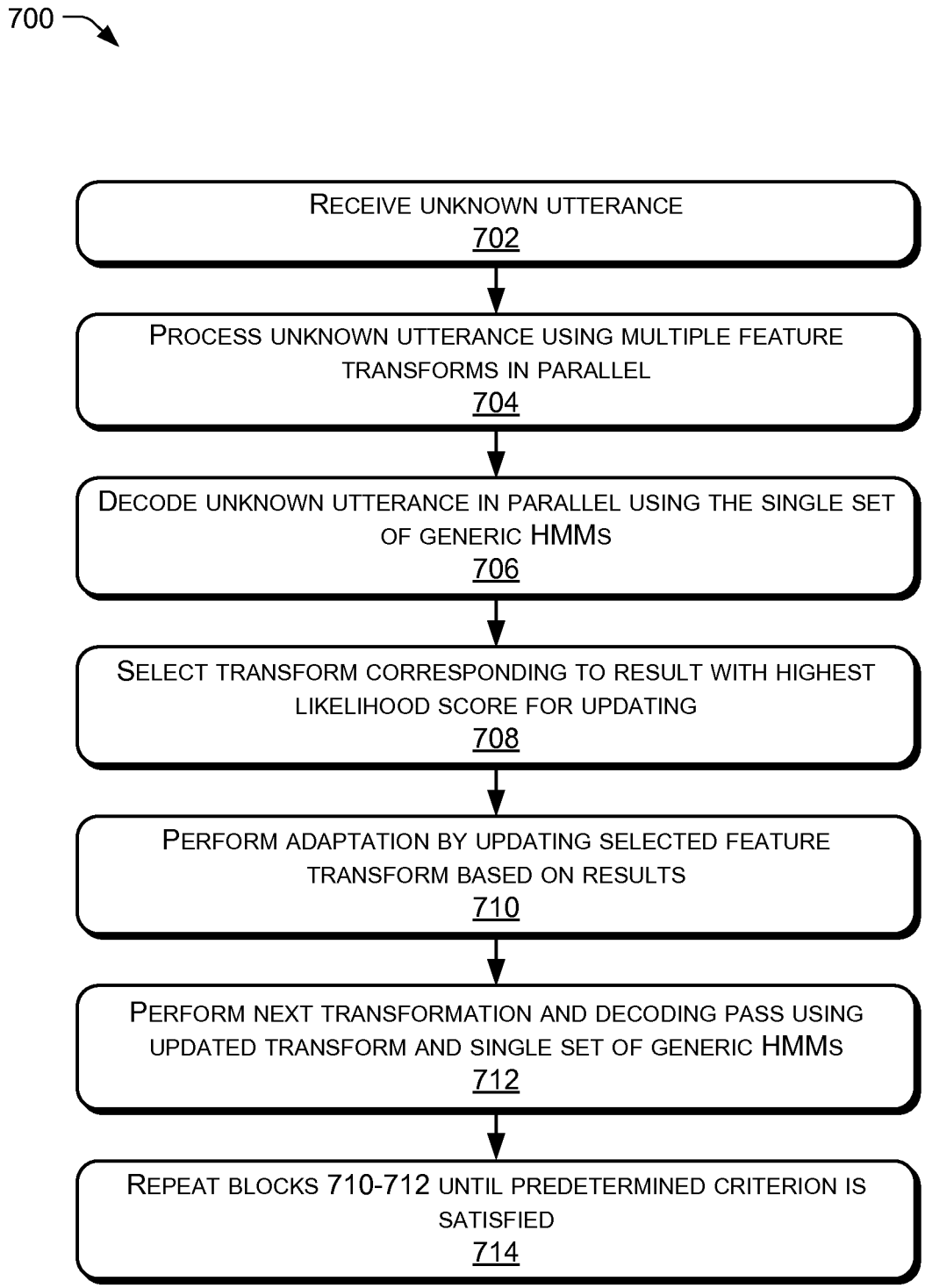
FIG. 7 illustrates a flow diagram of another example of a process for speech recognition according to some implementations.

FIG. 7 illustrates a flow diagram of an example of a process 700 for online recognition with a single set of generic CDHMMs, such as may be trained according to the implementations of FIG. 6. In the flow diagram, the operations are summarized in individual blocks. The operations may be performed in hardware, or as processor-executable instructions (software or firmware) that may be executed by one or more processors. Further, the process 700 may, but need not necessarily, be implemented using the architecture of FIG. 4. Consequently, by way of explanation, and not limitation, the process 700 is described in the context of the architecture of FIG. 4.

At block 702, an unknown utterance Y is received for speech recognition.

At block 704, given the unknown utterance Y, parallel processing is executed by using the trained feature transforms, such as were trained in the training process described for FIG. 6. For example, processing of feature vectors of the unknown utterance is carried out using the feature transforms FT3, FT5, FT6 to remove irrelevant factors from the sequence of feature vectors of the unknown utterance Y.

At block 706, the single set of generic HMMs is used to decode the parallel streams of feature vectors as processed using the multiple feature transform types. For example, the common set of FT6-based generic CDHMMs are applied in parallel to the feature vectors of the unknown utterance as transformed by FT3, FT5 and FT6 to obtain the "first-pass" recognition results, R1(FT3), R1(FT5), R1(FT6), respectively. The parallel decoding can be based on the provision that $\mu_{sm}=[\mu_{sm1},\ldots,\mu_{smD}]^T$ denotes the D-dimensional mean vector, and $\Sigma_{sm}=\text{diag}\{\sigma_{sm1}^2,\ldots,\sigma_{smD}^2\}$ denotes the diagonal covariance matrix for Gaussian component m in state s of generic CDHMMs. As a by-product of the parallel processing, the corresponding likelihood scores are also produced for each result, L1(FT3), L1(FT5), L1(FT6), respectively.

At block 708, the results and transform corresponding to the highest likelihood is determined, for selecting which type of transform function is used in online adaptation and updating.

At block 710, given the recognition result and the form of transforms, online adaptation is carried out to update $b^{(e)}$ (for FT3) or $b_k^{(e)}$ (for FT5 and FT6) using the corresponding IVN-trained transforms as initial values. The updating formulas used for the updating are the same as Eqs. (5)-(7) provided above with respect to block 514 of FIG. 5.

At block 712, a next transformation and decoding pass is performed on the unknown utterance using the updated set of transforms for the selected transform type and the single set of generic HMMs. For example, one of FT3, FT5 or FT6 is updated and used with the set of FT6-based generic CDHMMs to obtain a new recognition result.

At block 714, blocks 710-712 may be repeated until a pre-specified criterion is satisfied. For example, a fixed number of cycles (e.g., 3) may be specified, or the likelihood score may be compared with a minimum threshold, or the like.

Improving Recognition Speed Using Lattice Re—Scoring

Figure 8:
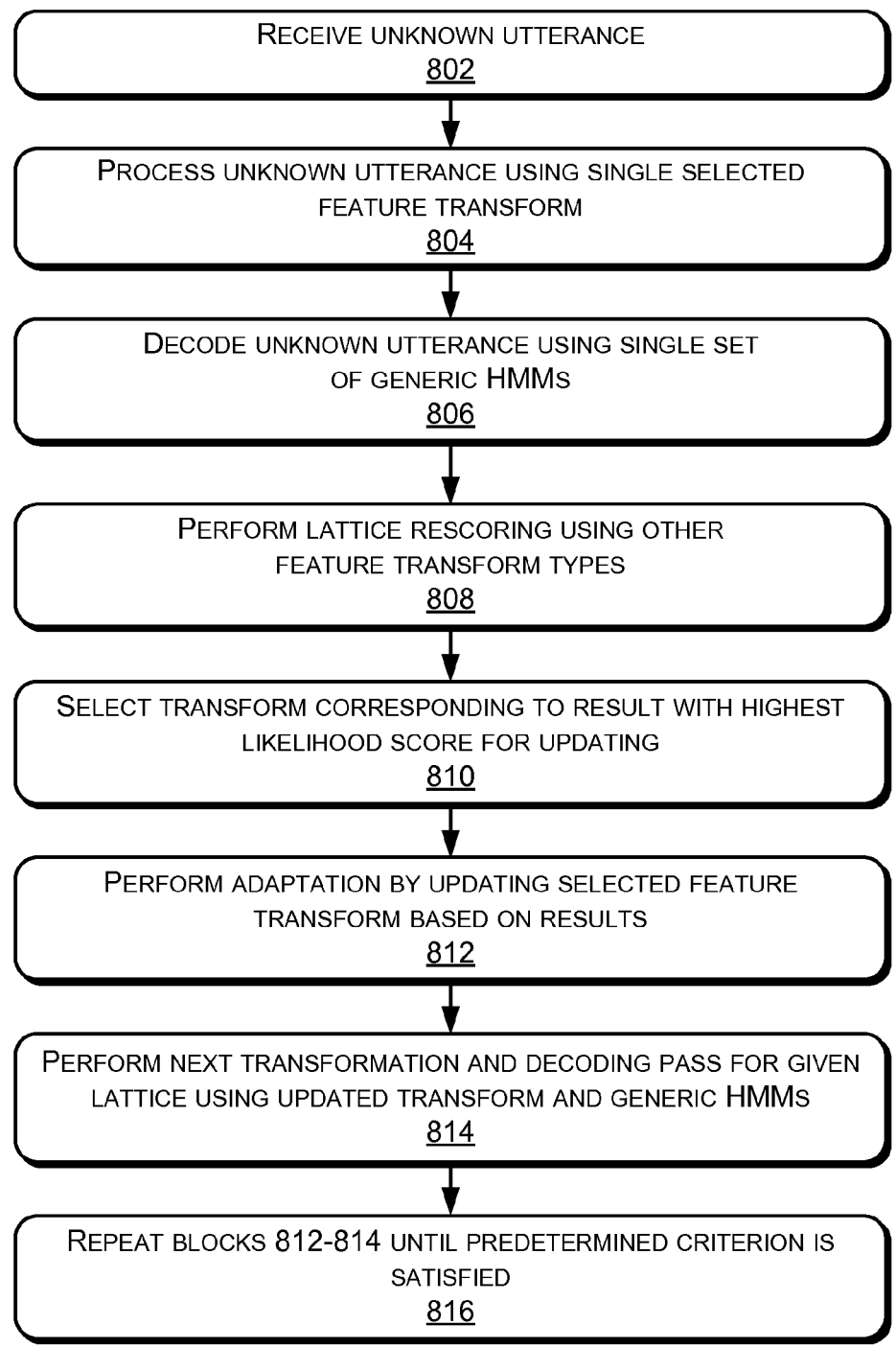
FIG. 8 illustrates a flow diagram of another example of a process for speech recognition according to some implementations.

FIG. 8 illustrates a flow diagram of an example of a process 800 for speech recognition with improved speed according to some implementations herein. In the flow diagram, the operations are summarized in individual blocks. The operations may be performed in hardware, or as processor-executable instructions (software or firmware) that may be executed by one or more processors. Further, the process 800 may, but need not necessarily, be implemented using the architecture of FIG. 4. Consequently, by way of explanation, and not limitation, the process 800 is described in the context of the architecture of FIG. 4. Further, the training procedure of these implementations may be the same as described above with respect to FIG. 6. Thus, in order to reduce recognition time, alternative implementations of a recognition procedure are set forth below.

At block 802, an unknown utterance Y is received for speech recognition.

At block 804, given the unknown utterance Y, feature vector transformation is carried out using a selected feature transform type. For example, feature transform FT5 (as trained above) is used to transform the feature vectors of the unknown utterance. FT5 may be selected as having a degree of freedom in between the other feature transform types.

At block 806, the single set of generic HMMs is used to decode the above transformed feature vectors of the unknown utterance to obtain recognition results and a corresponding lattice of recognition. For example, the common set of FT6-based generic CDHMMs may be used to decode the FT5-based transformed feature vectors to obtain the "first-pass" recognition results, R1(FT5), the corresponding likelihood score, L1(FT5), and a lattice of recognition results, Lattice (FT5). For example, a word lattice is a directed graph with a start and end node where each edge is labeled with a word and the corresponding likelihood score. A path from start node to end node represents a possible word sequence, and the sum of individual edge scores on the path gives the corresponding likelihood score of the word sequence. The path with the highest likelihood score will give the recognition result.

At block 808, for a given lattice, lattice rescoring is carried out using the other feature transform types. For example, given the Lattice(FT5) in the results of the first pass, lattice re-scoring is carried out using FT3 and FT6 (as trained above) to obtain the "first-pass" rescoring results, R1(FT3) and R1(FT6), respectively. As a by-product, the corresponding likelihood scores, L1(FT3) and L1(FT6), respectively, are also obtained. Lattice rescoring is carried out by recognizing an unknown utterance under a hypothesis space constrained by the corresponding lattice.

At block 810, the feature transform type that provides the highest likelihood is selected for online unsupervised adaptation.

At block 812, given the recognition result and the selected transform type, online adaptation is carried out. For example, adaptation can be carried out to update $b^{(e)}$ (for FT3) or $b_k^{(e)}$ (for FT5 and FT6) using the corresponding IVN-trained transforms as initial values. The updating formulas used for the updating are the same as Eqs. (5)-(7) provided above with respect to block 514 of FIG. 5.

At block 814, for the given lattice, a next pass at transformation and decoding is carried out using lattice re-scoring and the updated transforms. For example, given Lattice(FT5), new decoding may be executed via lattice re-scoring using the updated transforms and the set of FT6-based generic CDHMMs to obtain new recognition results.

At block 816, blocks 812-814 may be repeated until a pre-specified criterion is satisfied. For example, a fixed number of cycles (e.g., 3) may be specified, or the likelihood score may be compared with a minimum threshold, or the like.

Example Training Device

Figure 9:
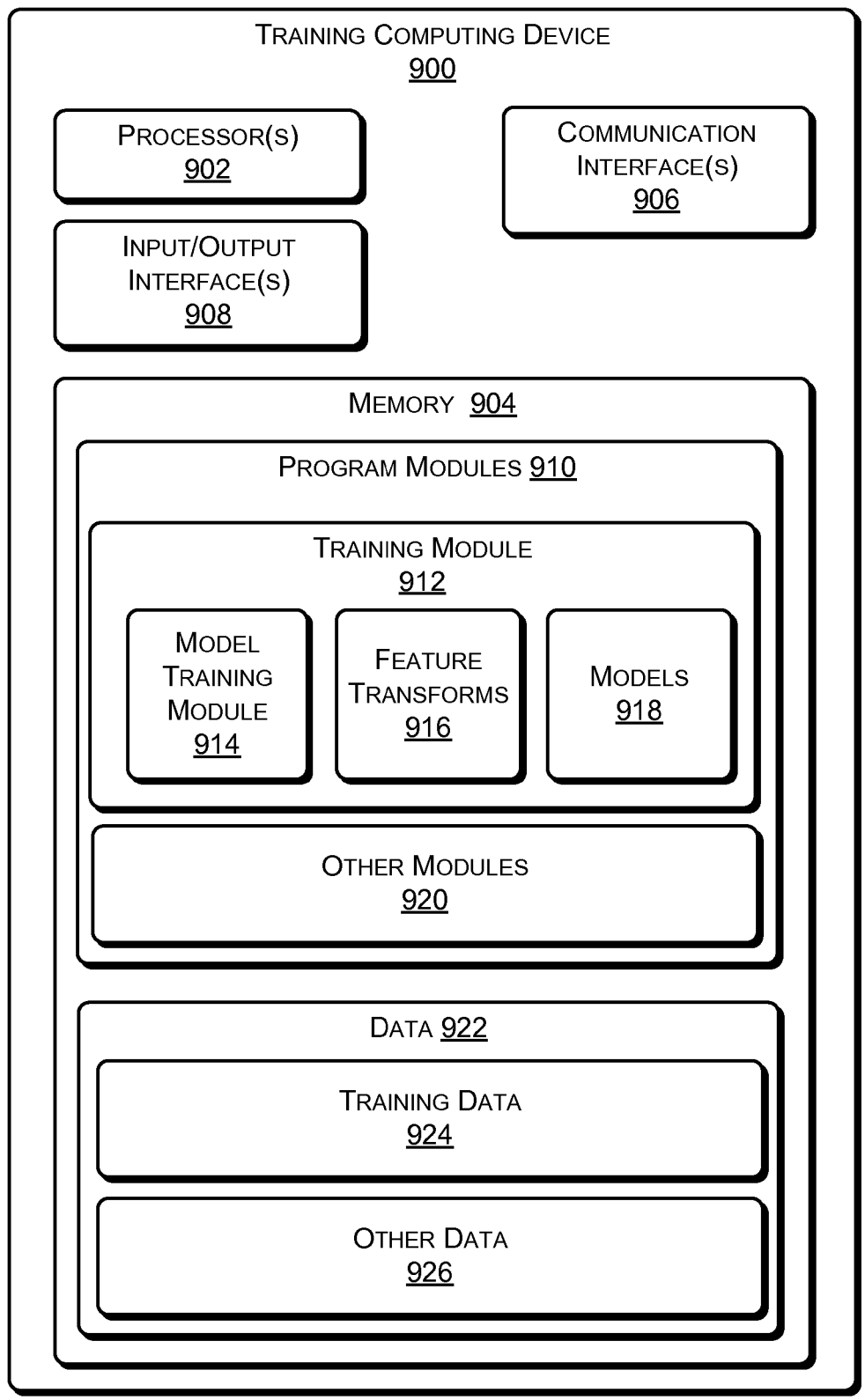
FIG. 9 illustrates an example of a training computing device according to some implementations.

FIG. 9 illustrates an example of a configuration of a training computing device 900 for executing training according to some implementations. In the illustrated example, training computing device 900 includes at least one processor 902 coupled to a memory 904, one or more communication interfaces 906, and one or more input/output interfaces 908. The processor 902 can be a single processing unit or a number of processing units, all of which may include single or multiple computing units or multiple cores. The processor 902 may be implemented as one or more microprocessors, microcomputers, microcontrollers, digital signal processors, central processing units, state machines, logic circuitries, and/or any devices that manipulate signals based on operational instructions. Among other capabilities, the processor 902 can be configured to fetch and execute computer-readable instructions or processor-accessible instructions stored in the memory 904 or other computer-readable storage media.

The memory 904 can comprise any computer-readable or processor-accessible storage media known in the art including, for example, volatile memory (e.g., RAM) and/or non-volatile memory (e.g., flash, etc.), mass storage devices, such as hard disk drives, solid state drives, removable media, including external drives, removable drives, floppy disks, optical disks (e.g., CD, DVD), or the like, or any combination thereof. The memory 904 stores computer-readable, processor-executable program instructions as computer program code that can be executed by the processor 902 as a particular machine configured for carrying out the methods and functions described in the implementations herein.

The communication interface(s) 906 facilitate communication between the training computing device 900 and devices (not shown). The communication interface(s) 906 can facilitate communications within a wide variety of networks and protocol types, including wired networks (e.g., LAN, cable, etc.) and wireless networks (e.g., WLAN, cellular, satellite, etc.), the Internet and the like. Communication interface(s) 906 can also provide communication with external storage (not shown), such as in a storage array, network attached storage, storage area network, or the like, which may contain training data.

Memory 904 includes a plurality of program modules 910 stored therein and executable by processor 902 for carrying out implementations herein. Program modules 910 include training module 912 that may include a model training module 914, trainable feature transforms 916 and trainable models 918, as discussed above. Memory 904 may also include other modules 920, such as an operating system, a database management module, communication software, security and access control modules, drivers, or the like. Furthermore, while training module 912 is shown as being implemented on a single training computing device 900, in other implementations, training module 912 may be implemented on a plurality of separate computing devices, such as in a distributed computing system suitable for training large models.

Memory 904 also includes data 922 that may comprise training data 924 for training the trainable models and feature transforms. In some implementations, training data 924 may be contained in a separate storage database, such as a storage array, storage area network, network attached storage, or the like, that is accessible by training computing device during a training stage. Further, while example training system configurations and architectures have been described, other implementations are not limited to the particular system configurations and architectures described herein.

Example Speech Recognition Device

Figure 10:
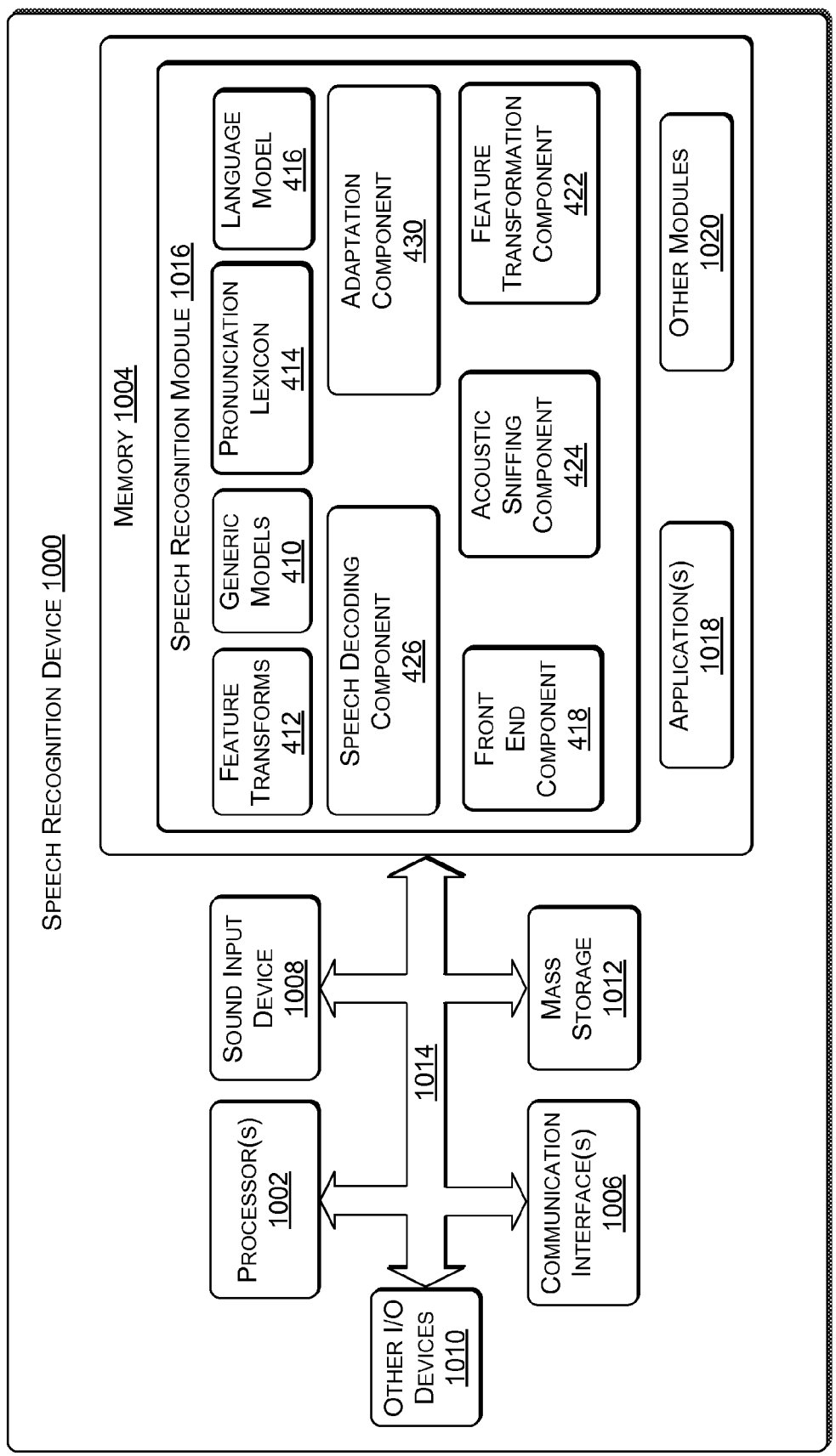
FIG. 10 illustrates an example of a speech recognition device according to some implementations.

FIG. 10 illustrates an example of a configuration of a speech recognition device 1000 that can be used to implement the components and modules described herein. The speech recognition device 1000 may include one or more processors 1002, a memory 1004, communication interfaces 1006, a sound input device 1008, other input/output (I/O) devices 1010, and one or more mass storage devices 1012 able to communicate with each other, such as via a bus 1014 or other suitable connection. Memory 1004 and mass storage devices 1012 are examples of computer-readable storage media for storing instructions which are executed by the processor 1002 to perform the various functions described above. For example, memory 1004 may generally include both volatile memory and non-volatile memory (e.g., RAM, ROM, or the like). Further, mass storage devices 1012 may generally include hard disk drives, solid-state drives, removable media, including external and removable drives, memory cards, Flash memory, floppy disks, optical disks (e.g., CD, DVD), or the like. Both memory 1004 and mass storage devices 1012 are non-transient computer storage media and may be collectively referred to as memory or computer-readable storage media herein.

The speech recognition device 1000 can also include one or more communication interfaces 1006 for exchanging data with other devices, such as via a network, direct connection, or the like, as discussed above. A sound input device 1008, such as a microphone, may be included as a specific input device for receiving speech to be recognized, although implementations herein are not limited to using a microphone. Other I/O devices 1010 may be devices that receive various inputs from a user and provide various outputs to the user, and can include a display, a keyboard, remote controller, a mouse, printer, other audio input/output devices, and so forth.

Memory 1004 may include modules and components for performing robust speech recognition according to the implementations herein. In the illustrated example, memory 1004 includes a speech recognition module 1016 that may contain functionality for online speech recognition. For example, speech recognition module may include generic models 410, feature transforms 412, pronunciation lexicon 414, language model 416, front end component 418, feature transformation component 422, acoustic sniffing component 424, speech decoding component 426, adaptation component 430, and other components or modules for carrying out speech recognition. Speech recognition module may comprise a speech recognition engine that is provided as part of an application. Alternatively, speech recognition module may be a separate module able to provide speech recognition services to other applications 1018 or other modules 1020. Other variations will also be apparent in light of the disclosure herein.

Example Environments

The speech recognition device 1000 described herein is only one example of a suitable device for some implementations and is not intended to suggest any limitation as to the scope of use or functionality of the architectures and configurations that can implement the features described herein. Neither should the speech recognition device 1000 be interpreted as having any dependency or requirement relating to any one or combination of components illustrated in the implementation of speech recognition device 1000. Thus, implementations herein are operational with numerous general purpose and special-purpose computing systems, environments or configurations, or other devices having processing capability. Examples of well-known systems and/or environments that may be suitable for use with the implementations herein include, but are not limited to, personal computers, server computers, hand-held or laptop devices, multiprocessor systems, smart phones, cell phones, set-top boxes, gaming devices, telephony systems, consumer electronics, automotive applications, and other devices or components that incorporate speech recognition.

Further, the components and modules herein, such as the modules and components described with respect to FIGS. 1, 4, 9 and 10, can be employed in many different environments and situations. Generally, any of the functions described with reference to the figures can be implemented using software, hardware (e.g., fixed logic circuitry) or a combination of these implementations. The term "logic," "module," "mechanism" or "functionality" as used herein generally represents software, hardware, or a combination of software and hardware that can be configured to implement prescribed functions. For instance, in the case of a software implementation, the term "logic," "module," "mechanism" or "functionality" can represent program code (and/or declarative-type instructions) that performs specified tasks or operations when executed on a processing device or devices (e.g., CPUs or processors). The program code can be stored in one or more computer-readable memory devices or other computer-readable storage devices. Thus, the methods and modules described herein may be implemented by a computer program product. The computer program product may include computer-readable media having a computer-readable program code embodied therein. The computer-readable program code may be adapted to be executed by one or more processors to implement the methods and/or modules of the implementations described herein. The terms "computer-readable media," "processor-accessible media," or the like, refer to any kind of machine-readable storage medium for retaining information, and can include the various kinds of storage devices discussed above.

In addition, implementations herein are not necessarily limited to any particular programming language. It will be appreciated that a variety of programming languages may be used to implement the teachings described herein. Further, it should be noted that the system configurations illustrated are purely examples of systems in which the implementations may be provided, and the implementations are not limited to the particular hardware configurations illustrated.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described in connection with the implementations is included in at least one implementation, and the appearances of these phrases in various places in the specification are not necessarily all referring to the same implementation. Additionally, in the description, numerous specific details are set forth in order to provide a thorough disclosure. However, it will be apparent to one of ordinary skill in the art that these specific details may not all be utilized in all implementations. In other circumstances, well-known structures, materials, circuits, processes and interfaces have not been described in detail, and/or are illustrated in block diagram form, so as to not unnecessarily obscure the disclosure.

CONCLUSION

Implementations described herein provide for speech recognition by modeling speech units in a structured manner and applying irrelevant variability normalization for learning information most useful for phonetic classification from a large amount of diversified training data. Furthermore, some implementations enable multiple recognition passes to be executed while performing adaptation of the parameters used to carry out the speech recognition for improving the results. Certain implementations provide for adaptation of the structured models by using a speech segment input itself during the adaptation.

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this patent is to be determined entirely by the following claims, along with the full range of equivalents to which such claims are entitled.

The invention claimed is:

1. A method comprising:
receiving an unknown utterance;
generating a first sequence of feature vectors from the unknown utterance;
removing, in a first recognition pass and using a parameter, at least a portion of irrelevant information from the first sequence of feature vectors resulting in a second sequence of feature vectors and performing parallel removal of the irrelevant information from the first sequence of feature vectors using, in parallel, multiple vector mapping functions having differing degrees of freedom;
recognizing speech in the first recognition pass based at least in part on the second sequence of feature vectors to obtain a first result;
updating the parameter used in the removing based at least in part on the first result;
removing, in a second recognition pass, using the updated parameter, at least a portion of irrelevant information from the first sequence of feature vectors resulting in a third sequence of feature vectors; and
recognizing speech in the second recognition pass based at least in part on the third sequence of feature vectors to determine a second result.

2. The method according to claim 1, the removing in the first recognition pass and the second recognition pass further comprising applying a vector mapping function to the first sequence of feature vectors.

3. The method according to claim 2, the updating the parameter further comprising updating the vector mapping function.

4. The method according to claim 3, the updating the vector mapping function further comprising updating at least one of an A matrix or a bias vector of the vector mapping function.

5. The method according to claim 1, the recognizing speech in the first recognition pass further comprising:
applying multiple hidden Markov models to corresponding first sequences of feature vectors subject to the parallel removal by the multiple vector mapping functions for obtaining multiple first results; and
selecting a first result from the multiple first results having a highest likelihood score for updating a corresponding vector mapping function of the multiple vector mapping functions for use in the removing in the second recognition pass.

6. The method according to claim 1, the recognizing speech in the first recognition pass further comprising applying a single set of hidden Markov models for obtaining multiple first results, the single set of hidden Markov models corresponding to one of the multiple vector mapping functions.

7. The method according to claim 1, wherein the removing in the first recognition pass is performed using a first vector mapping function, the obtaining the first result in the first recognition pass further comprising:
obtaining a lattice of recognition results, and, for a given lattice, performing lattice re-scoring using one or more second vector mapping functions having a different degree of freedom from the first vector mapping function to obtain first pass re-scoring results;
selecting for adaptation the vector mapping function corresponding to a highest likelihood; and
using the selected vector mapping function corresponding to a highest likelihood in the second recognition pass.

8. A computer-implemented method comprising:
training a generic set of hidden Markov models using training data and at least a first vector mapping function, the first vector mapping function removing at least a portion of information not relevant to recognizing speech from feature vectors derived from the training data;

training the first vector mapping function based at least in part on the training data while training the set of hidden Markov models; and training a second vector mapping function having a differing degree of freedom from the first vector mapping function based at least in part on the generic set of hidden Markov models.

9. The method according to claim 8, further comprising providing the trained generic set of hidden Markov models, the trained first vector mapping function, and the second vector mapping function to a speech recognition engine to use in recognizing speech from an unknown utterance.

10. The method according to claim 8, further comprising adapting the second vector mapping function during training of the second vector mapping function based on re-estimation of one or more parameters of the second vector mapping function.

11. Computer-readable storage media containing processor-executable instructions to be executed by a processor for carrying out the method according to claim 8.

12. A device comprising:
a processor coupled to computer-readable storage media containing instructions executable by the processor;
an irrelevant information removal component implemented by the processor to receive a sequence of feature vectors and remove at least a portion of acoustic information not relevant to recognizing a unit of speech from the sequence;
a set of generic hidden Markov models stored on the computer-readable storage media, the set of generic hidden Markov models having been trained using training data and at least one vector mapping function used to remove the portion of acoustic information; and
a plurality of vector mapping functions having differing degrees of freedom stored on the computer-readable storage media, the plurality of vector mapping functions having been trained using the training data during training of the set of generic hidden Markov models.

13. The device according to claim 12, the irrelevant information removal component comprising a feature transformation component for applying a vector mapping function to the sequence of feature vectors to remove the portion of the acoustic information not relevant to recognizing a unit of speech from the sequence.

14. The device according to claim 13, further comprising an acoustic sniffing component to sample at least a portion of the feature vectors for identifying the vector mapping function to be used by the feature transformation component.

15. The device according to claim 13, further comprising a speech decoding component to recognize the unit of speech from the feature vectors following the removal of the portion of the acoustic information.

16. The device according to claim 15, the recognized unit of speech comprising a first result from a first pass of the sequence of feature vectors, and further comprising an adaptation component to update a vector mapping function based on the first result, the feature transformation component using the updated vector mapping function to remove at least a portion of acoustic information not relevant to recognizing a unit of speech from the sequence of feature vectors during a second pass of the sequence of feature vectors, the speech decoding component recognizing the unit of speech from the sequence of feature vectors during the second pass, the unit of speech comprising a second result.

17. The device according to claim 13, wherein the set of generic hidden Markov models include acoustic models used by a speech decoding component to recognize the unit of speech.

* * * * *